United States Patent [19]

Hurt et al.

[11] 4,437,151
[45] Mar. 13, 1984

[54] COORDINATE MEASURING MACHINE INSPECTION AND ADJUSTMENT METHOD

[75] Inventors: James J. Hurt, Bettendorf; Susan K. Foss, LeClaire, both of Iowa

[73] Assignee: Deere & Company, Moline, Ill.

[21] Appl. No.: 368,950

[22] Filed: Apr. 16, 1982

[51] Int. Cl.³ ............................................. G01C 25/00
[52] U.S. Cl. .................................... 364/571; 364/559; 364/560; 364/474; 33/174 L
[58] Field of Search .............. 364/559, 560, 561, 562, 364/563, 571, 474, 475, 513; 33/174 L; 318/572, 652

[56] References Cited

U.S. PATENT DOCUMENTS 3,795,054  4/1974  Kinney .............................. 33/174 L
4,096,770  6/1978  Tanner ................................ 364/474
4,364,182 12/1982  Jones ................................. 33/174 L

*Primary Examiner*—Jerry Smith
*Assistant Examiner*—Allen MacDonald

[57] ABSTRACT

A coordinate measuring machine (CMM) inspection and adjustment method includes installing an artifact on the CMM table. The CMM probe is coupled to the artifact and moved to a plurality of positions defined by the artifact so that the CMM generates a plurality of Cartesian coordinate data points. A set of distance equations are generated in terms of the data points, a known dimension of the artifact and unknown CMM axis alignment and scale error factors. The set of equations is solved for the error factors, which are then converted to numbers which represent the magnitude of the needed CMM adjustments. The CMM can then be adjusted to a properly aligned condition according to these numbers.

7 Claims, 7 Drawing Figures

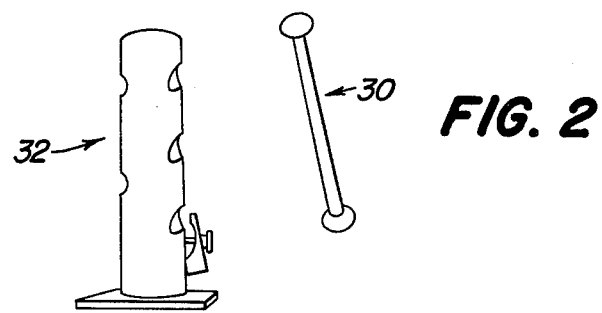
FIG. 2
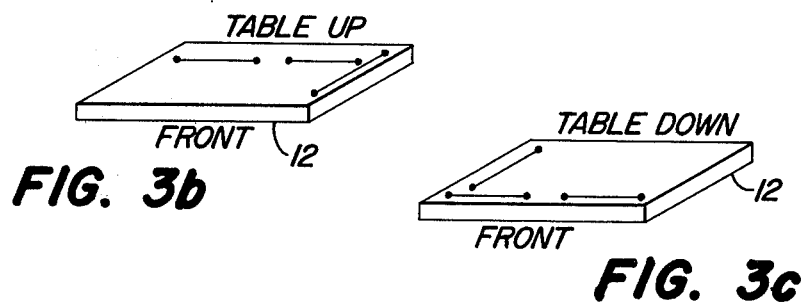
FIG. 3b
FIG. 3c
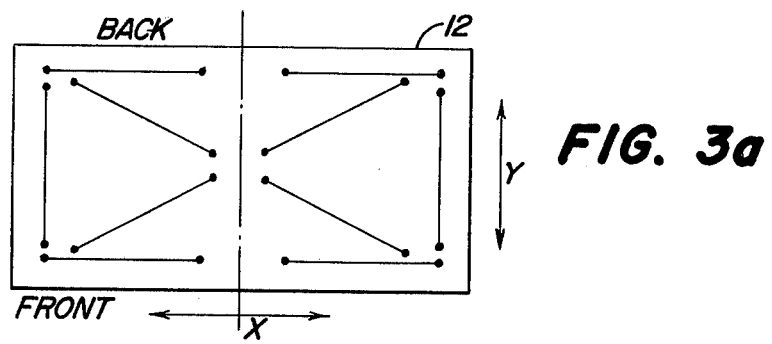
FIG. 3a
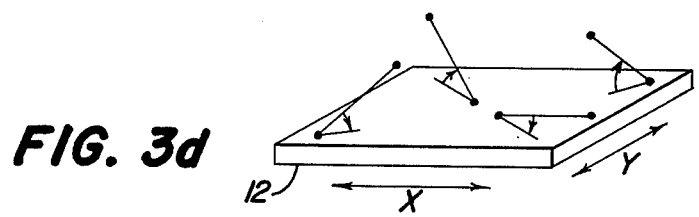
FIG. 3d

COORDINATE MEASURING MACHINE INSPECTION AND ADJUSTMENT METHOD

BACKGROUND OF THE INVENTION

The present invention relates to a method for determining the alignment or misalignment of the axes of a coordinate measuring machine.

In order for coordinate measuring machines (CMM) to operate properly, their axes must be aligned perpendicularly with respect to each other and their position transducers must be properly positioned with respect to the axes. Heretofore, if a CMM has been in need of adjustment, extremely time-consuming procedures have been used to determine and make the necessary adjustments. For example, one prior method for determining axis misalignment is as follows:

(a) Positioning a granite cube on the CMM table with a first side aligned with the CMM X axis and then measuring the variation in the CMM-generated Y coordinate as the CMM probe is moved over the first side, then adjusting the cube position until no Y variation is produced.

(b) Move the CMM probe over a second side (perpendicular to the X axis) and measure the variation in the CMM-generated X coordinate. The ratio of the X coordinate variation to the Y coordinate variation is a measure of the misalignment between the CMM X and Y axes.

(c) Measure Y and Z axis misalignment by repeating steps (a) and (b), using appropriate sides of the granite block and substituting Y for X and Z for Y in steps (a) and (b).

(d) Measure X and Z misalignment by repeating steps (a) and (b), using another pair of sides and substituting X for X and Z for Y.

In addition to being time-consuming, this granite square method is subject to errors caused by imprecise positioning of the granite square on the CMM table.

Another time-consuming method is used to measure axis scale errors and involves the use of a laser and the following steps:

(a) A reflector for a laser interferometer is attached to the CMM in place of the CMM probe.

(b) The Y and Z axes of the CMM are locked so that only movement along the X axis is allowed.

(c) A laser interferometer is alinged so that its beam travels parallel to the X axis and strikes the reflector.

(d) The reflector is then moved along the X axis of the CMM and CMM-generated X axis readings and the interferometer readings are obtained. From these readings the scale error in the CMM X axis can be determined.

(e) Steps a-d are then repeated for the Y and Z axes.

Also known are CMM inspection procedures which involve the use of artifacts such as the barbell and the Bryan Gauge. However, the data generated by the CMM during these procedures has heretofore been utilized only on a pass-fail basis, and has not been used to determine exactly what CMM adjustments are needed. In other words, if use of the above artifacts indicated that adjustment was required, then the previously described granite block or laser interferometer procedures would have to be used in making the needed adjustments.

The above-described time-consuming methods are inefficient because they require frequent manual positioning of hardware devices such as the granite block and the laser interferometer. Then all the data generated by these procedures has to be recorded and manipulated, after which further adjustments and checking may be needed.

SUMMARY OF THE INVENTION

An object of the present invention is to provide an efficient CMM alignment and adjustment procedure.

Another object of the present invention is to provide a CMM alignment method which requires a minimum of manual manipulation of hardware devices, such as granite blocks and laser interferometers.

Another object of the present invention is to provide a CMM alignment method which utilizes the powerful automatic computation capabilities of current computerized CMM systems.

Another object of the present invention is to provide a CMM adjustment procedure which makes use of known artifacts, such as the barbell and the Bryan Gauge.

These and other objects are achieved by the present invention which includes installing a CMM artifact on a CMM table, coupling the CMM probe to the artifact and storing a plurality of CMM-generated cartesian coordinate data points for a plurality of positions defined by the artifact. A data processor is programed to generate a set of distance equations in terms of the CMM generated cartesian coordinates, a known dimension of the artifact and a plurality of unknown CMM axis alignment error and scale error factors. This set of equations is then solved for the unknown error factors, from which can be determined the necessary CMM adjustments. The CMM can then be properly aligned by making the indicated adjustments. In one version of this procedure, the artifact may be a barbell. In another version, the artifact may be a Bryan Gauge.

BRIEF DESCRIPTION OF THE DRAWINGS

FIG. 2 is a view of an artifact known as a barbell and the stand into which it may be mounted for use in the present invention;

FIGS. 3a–3d are simplified views illustrating a number of possible artifact orientations which could be used with the present invention.

DETAILED DESCRIPTION

Figure 1:
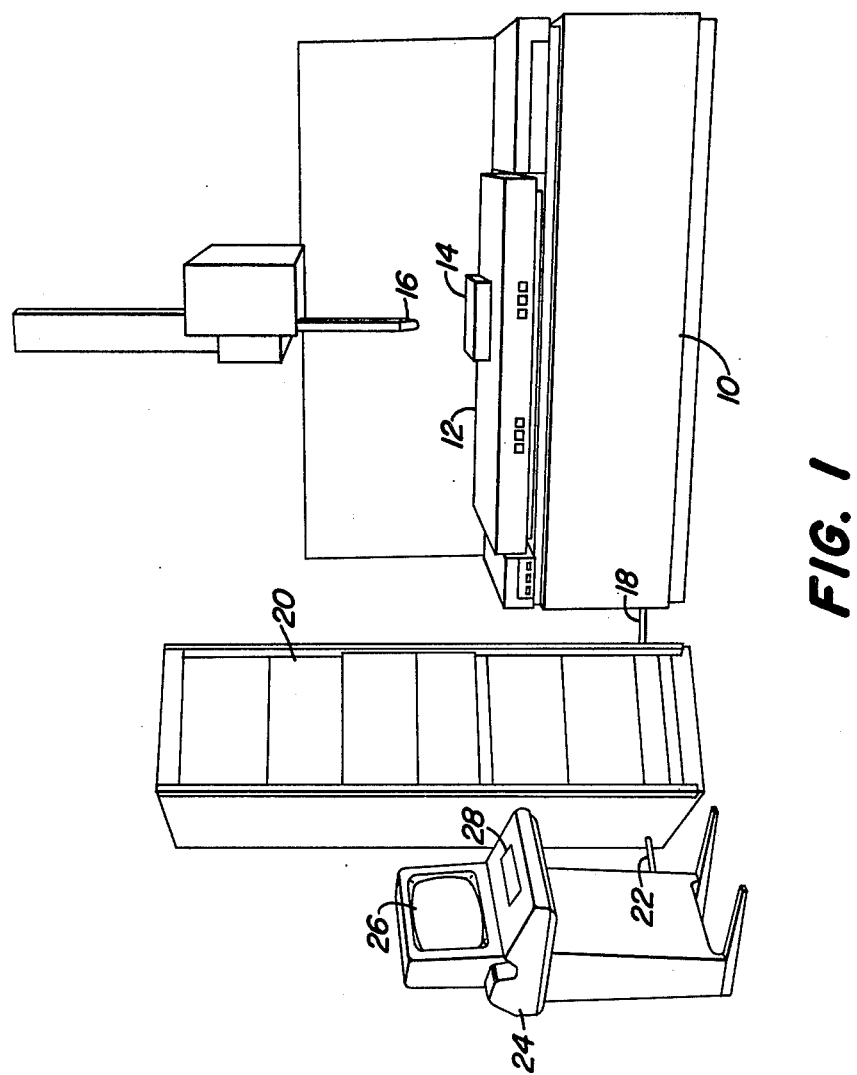
FIG. 1 is an overview of a computerized coordinate measuring machine system to which the present invention can be applied.

Referring now to FIG. 1, therein is shown a coordinate measuring machine (CMM) 10 of a type which is commercially available from such companies as the Boice Division of Mechanical Technology, Inc. of Latham, N.Y. The CMM 10 includes a table 12 upon which a machined part, such as the machined part 14, may be placed for inspection by an operator who moves a probe 16 of the CMM 10 into contact with various machined features on the machined part 14. Upon contacting a feature, the probe 16 will cause the CMM 10 to provide three-dimensional, rectangular cartesian coordinate signals representative of the location of the feature relative to a predetermined point in the CMM 10. The CMM 10 includes guide members (not shown) which ideally are aligned with the X, Y and Z axes of a rectangular cartesian coordinate system. Linear transducers (not shown) coupled to these guide members sense the position of the CMM probe 16 in relation to the guide members.

The CMM 10 is connected by a cable 18 to a general purpose computer or programmable data processor (PDP) 20. The programmable data processor 20 is of a type generally well known in the art and the equivalents thereof include: the General Automation SPC-16; the IBM 370 TSO; the Control Data Corporation 6000 NOS; and the IBM System 7. In the preferred embodiment, the programmable data processor 20 is a PDP-11 from the Digital Equipment Corp. of Maynord, Mass. The programmable data processor 20 has a memory and is capable of being programmed in U.S.A. Standard FORTRAN to manipulate various inputed signals as will later be explained.

The programmable data processor 20 is connected by a cable 22 to a conventional CRT or computer readout-/in terminal 24. The computer readout/in terminal 24 may be of any type capable of inputting and outputting information into a programmable data processor but in the preferred embodiment it is of the type manufactured by the Tektronix Corportion of Beaverton, Oreg. which includes a video screen 26 and a keyboard 28. The computer readout/in terminal 24 is capable of inputting both the program as well as basic input data through the keyboard 28 and is capable of providing a readout of computer data on the screen 26. For more information about this CMM system, the reader is referred to U.S. Pat. No. 4,296,474, which is incorporated by reference herein.

As part of the qualification or inspection process for a CMM 10 it is advantageous to determine if the CMM 10 has alignment errors due to relative misalignment of the guide members with respect to the X, Y and Z axes or has scale errors due to incorrect positioning of the linear transducers.

According to one embodiment of the present invention, these errors may be determined by first installing a conventional artifact known as a barbell 30 on the CMM table 12. The barbell 30 is simply an apparatus with two spherical ends interconnected by a rigid rod so that the ends are a calibrated and known distance, d, apart. As is well known in the art, the barbell 30 may be placed in various positions on the table 12 or it may be held in various positions in a support stand 32 which is then mounted on the table. For each of a plurality of barbell positions, such as illustrated in FIGS. 3a-3d, the CMM probe 16 is coupled sequentially to both ends of the barbell 30. In the case of the barbell 30, the probe 16 is preferably an inverted cone (not shown), which receives the spherical ends of the barbell so that the probe 16 can be consistently positioned with respect to the barbell. Then, for each ith barbell position, Pi, the CMM 10 generates a pair of cartesian coordinate data points ($Xi_1$, $Yi_1$, $Zi_1$) and ($Xi_2$, $Yi_2$, $Zi_2$) corresponding to the two barbell ends. These data point pairs, corresponding to the ith position of the barbell 30, are stored in the memory of the data processor 20.

From these input data points, the data processor 20 is programmed to generate a first set of distance equations containing i equations as follows:

$$d^2 = (1+e_1)(dXi)^2 + 2e_2(dXi)(dYi) + 2e_3(dXi)(dZi) + (1+e_4)(dYi)^2 + 2e_5(dYi)(dZi) + (1+e_6)(dZi)^2, \quad (100)$$

where $dXi = (Xi_1 - Xi_2)$, $dYi = (Yi_1 - Yi_2)$, $dZi = (Zi_1 - Zi_2)$, d = known length of the barbell and $e_1$ through $e_6$ are unknown axis alignment error and axis scale error factors to be determined.

Depending upon the number of data points taken, this first set of equations may contain more equations than the number of unknowns, $e_1$ through $e_6$. Therefore, it is necessary to reduce, or normalize, this first set of equations to a set of equations known as a set of "least squares normal equations" which contains a number of equations, such as the distance equation described above, which is equal to the number of unknowns, which is six in this case. This may be accomplished through a well known data reduction or normalizing technique, such as described in pages 164–176 of "Data Reduction and Error Analysis for the Physical Sciences", by P. R. Bevington, McGraw Hill, 1969, which is incorporated by reference herein.

This normalized or compressed equation set is then solved for each of the unknown error factors $e_1$ through $e_6$. This equation set may be solved by conventional linear equation solving methods or algorithms. One such method would be the well known variation of Gaussion Elimination known as "Doolittle's Method". Another well known equation solving method would be the method known as the "Critical Value Method", which is also known as "Jacobi's Method" in the case of normal equations.

The error factors $e_1$ through $e_6$ can then be related to the angles between the X, Y, and Z axes and to the scale errors along each axis according to the following equations:

$$\text{scale error in } X \text{ axis, } SE_x = \sqrt{1 + e_1} - 1; \quad (102)$$

$$\text{scale error in } Y \text{ axis, } SE_y = \sqrt{1 + e_4} - 1; \quad (103)$$

$$\text{scale error in } Z \text{ axis, } SE_z = \sqrt{1 + e_6} - 1; \quad (104)$$

$$\text{angle between } x \text{ and } z \text{ axes, } Axz = \quad (105)$$
$$\text{arcosine } (e_3/(\sqrt{1+e_1} \times \sqrt{1+e_6}));$$

$$\text{angle between } x \text{ and } y \text{ axes, } Axy = \quad (106)$$
$$\text{arcosine } (e_2/(\sqrt{1+e_1} \times \sqrt{1+e_4}));$$

$$\text{angle between } y \text{ and } z \text{ axes, } Ayz = \quad (107)$$
$$\text{arcosine } (e_5/(\sqrt{1+e_4} \times \sqrt{1+e_6})).$$

If required, the X, Y and Z axis guide members (not shown) may then be adjusted according to the calculated relative axis angles Axz, Axy and Ayz so that the guide members are truly perpendicular to each other, as would be the axes of a rectangular coordinate system. Also, the linear transducers (not shown) of the CMM 10, may be adjusted with respect to the guide members to eliminate the scale errors represented by the axis scale errors SEx, SEy and SEz. With these adustments, the CMM 10 will operate in a more reliable and accurate manner.

Figure 4:
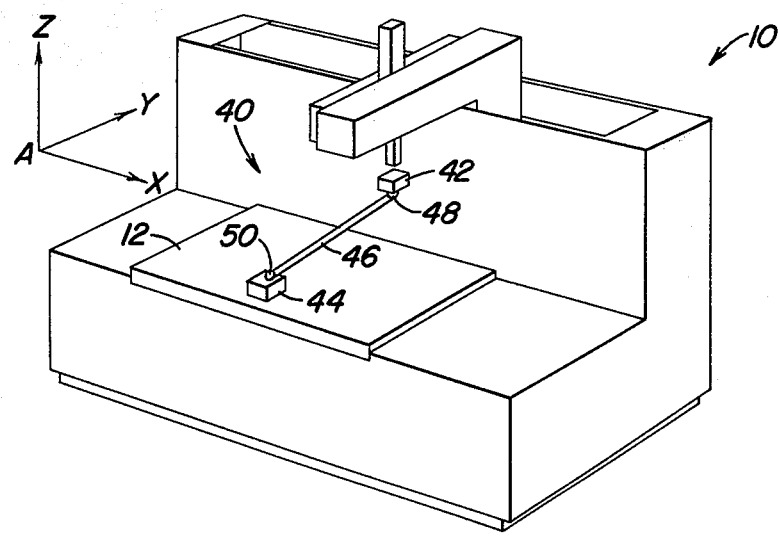
FIG. 4 is an overview of a coordinate measuring machine with a Bryan Gauge installed thereon for use in an embodiment of the present invention.

An alternate embodiment of the present invention involves first installing a conventional artifact 40 known as a "Bryan Gauge" on the CMM table 12. See FIG. 4. The Bryan Gauge 40 consists of a magnetic block 42 attached to the CMM 10 in place of the probe 16, a magnetic block 44 fixed to the CMM table 21 and a bar 46 with tooling balls 48 and 50 attached to each end so that the tooling balls 48 and 50 are a fixed distance, r, apart.

Block 42 is then moved around to various positions, but is constrained to move on the surface of a sphere as the Bryan Gauge pivots about its fixed tooling ball 50. During this movement, the CMM generates a plurality of cartesian coordinate data points ($Xj$, $Yj$, $Zj$) representing a plurality of sphere surface positions, $Pj$.

From these data points, the data processor 20 is programmed to generate a corresponding plurality or set of sphere equations:

$$(Xj-Xc)^2 + (Yj-Yc)^2 + (Zj-Zc)^2 - r^2 = 0, \quad (108)$$

where r is the length of the Bryan Gauge and Xc, Yc and Zc are unknown cartesian coordinates of the center of the spherical surface containing positions Pj.

Again, there will be more equations (108) than unknowns, so this first set of equations (108) is normalized, reduced or compressed into a set of least squares normal equations by the known method referred to previously herein. This set of least squares normal equations is then solved for the sphere center coordinates (Xc, Yc, Zc) and the distance r. Note, however, that if the Bryan Gauge is calibrated and r is known, then this known value can be substituted into the equations (108) and only the sphere center coordinates need to be solved for.

Next, another set of distance equations is generated as follows:

$$r^2 = (1+e_1)(dXj)^2 + 2e_2(dXj)(dYj) + 2e_3(dXj)(dZj) + (1+e_4)(dYj)^2 + 2e_5(dYj)(dZj) + (1+e_6)(dZj)^2, \quad (110)$$

where $dXj=(Xj-Xc)$; $dYj=(Yj-Yc)$, $dZj=(Zj-Zc)$, r=the Bryan Gauge length, and $e_1$ through $e_6$ are again the axis alignment and scale error factors to be determined. This set of equations also contains more equations than unknowns, and therefore is also compressed to a set of least squares normal equations as previously described. Then this set of least squares normal equations is solved for the error factors $e_1$ through $e_6$ by "Doolittle's Method" or "Jacobi's Method", also as previously described.

Finally, these error factors $e_1$ through $e_6$ are used in equations (102)–(107) to determine the scale error factors SEx–SEz and the axis alignment error factors Axz, Axy and Ayz, after which the guide members and transducers of the CMM 10 can be adjusted if required.

The conversion of the above procedure into U.S. Standard FORTRAN for utiliziation in cooperation with the data processor 20 will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims. For example, the present invention could be used with any calibrated artifact which defines a pair of positions a known distance apart.

We claim:

1. A method for determining the alignment of axes of a coordinate measuring machine (CMM) having a probe movable along the axes, the method comprising the steps of:
   (a) installing an artifact on the CMM, the artifact having at least two ends separated by a certain distance;
   (b) moving the probe and at least one end of the artifact to a plurality of positions defined by the artifact so that the CMM generates a set of Cartesian coordinates cooresponding to said plurality of positions;
   (c) generating a set of distance equations, each distance equation being for the distance between a first position and a second position where said first and second positions are defined by the artifact and wherein at least one of said first and second positions is represented by one of said set of Cartesian coordinates, each distance equation being in terms of the CMM generated coordinates, the certain distance and axis alignment error and scaling error factors to be determined;
   (d) determining said error factors by solving said set of distance equations for said error factors; and
   (e) adjusting the CMM according to the determined error factors.

2. The method of claim 1, wherein:
   the artifact comprises a barbell having first and second ends separated by a known distance; and
   step (b) comprises moving the barbell to a plurality of positions and, for each of said positions of the barbell, coupling the CMM probe to both ends of the barbell so that the CMM generated coordinates represent positions defined by the ends of the barbell.

3. The method of claim 1, wherein:
   step (c) comprises generating a preliminary set of distance equations, and if the number of equations in said first set is greater than the number of error factors to be determined, then reducing said first set of equations to a second set of least squares normal equations, said second set having a number of equations which is equal to the number of error factors to be determined; and
   step (d) comprises determining said error factors by solving said second set of equations for said error factors.

4. The method of claim 1, wherein:
   the artifact comprises a Bryan Gauge having a first end pivotally coupled on a table of the CMM and a second end movable with respect to the first end over a spherical surface and separated therefrom by the certain distance which is to be determined; and
   step (c) comprises generating a set of sphere equations in terms of the CMM generated coordinates, unknown coordinates of a center of said spherical surface and the distance to be determined, determining said sphere center coordinates and said distance to be determined by solving said set of sphere equations, generating a set of distance equations, each distance equation being for the distance between the center of said spherical surface and one of said plurality of positions, said distance equations being in terms of the sphere center coordinates, the CMM generated coordinates, the determined distance, and axis alignment error and scaling error factors to be determined.

5. The method of claim 4, wherein step (c) comprises:

generating a first set of sphere equations containing more equations than the number of unknown sphere center coordinates and the distance to be determined;

reducing said first set of equations to a second set of least squares normal sphere equations having a number of equations which is equal to the number of unknowns; and determining the unknown sphere center coordinates and the distance to be determined by solving the second set of equations for the unknown sphere center coordinates and the distance to be determined;

generating a first set of the distance equations, the first set having more equations than the number of error factors to be determined;

reducing said first set of the distance equations to a second set of least squares normal distance equations having a number of equations which is equal to the number of error factors to be determined.

6. The method of claim 1, wherein:

the artifact comprises a Bryan Gauge having a first end pivotally fixed on a table of the CMM and a second end movable with respect to the first end and separated therefrom by a known distance;

step (b) comprises coupling the CMM probe to the second end of the Bryan Gauge and pivoting the Bryan Gauge about its first end to a plurality of positions lying on a spherical surface so that the CMM generated coordinates represent said plurality of positions; and step (c) comprises determining the coordinates of the center of said spherical surface, generating the set of distance equations, each distance equations being for the distance between the center of said spherical surface and one of said plurality of positions, said distance equations being in terms of the sphere center, the CMM generated coordinates, the known distance, and axis alignment error and scaling error factors to be determined.

7. The method of claim 1, wherein:

the artifact comprises a Bryan Gauge having a first end pivotally fixed on a table of the CMM and a second end movable with respect to the first end and separated therefrom by a known distance;

step (b) comprises coupling the CMM probe to the second end of the Bryan Gauge and pivoting the Bryan Gauge about its first end to a plurality of positions lying on a spherical surface so that the CMM generated coordinates represent said plurality of positions; and step (c) comprising generating a set of sphere equations in terms of unknown sphere center coordinates, the known distance and the CMM generated coordinates, determining the unknown sphere center coordinates by solving the set of sphere equations for the sphere center coordinates, and generating the set of distance equations, each distance equation being for the distance between the sphere center and one of the positions represented by the CMM generated coordinates, each distance equation being in terms of the sphere center coordinates, the CMM generated coordinates, the known distance and the error factors to be determined.

* * * * *

UNITED STATES PATENT AND TRADEMARK OFFICE
CERTIFICATE OF CORRECTION

PATENT NO. : 4,437,151
DATED : 13 March 1984
INVENTOR(S) : James Joseph Hurt and Susan Kay Foss It is certified that error appears in the above-identified patent and that said Letters Patent is hereby corrected as shown below:

Column 6, line 9, delete "cooresponding" and insert
-- corresponding --.

*Signed and Sealed this*

*Eighth* Day of *January 1985*

[SEAL]

*Attest:*

*Attesting Officer*

GERALD J. MOSSINGHOFF

*Commissioner of Patents and Trademarks*